US012772208B2

(12) United States Patent
Liu et al.

(10) Patent No.: US 12,772,208 B2
(45) Date of Patent: Oct. 20, 2026

(54) METHOD, DEVICE, AND SYSTEM FOR DATA TRANSMISSION IN WIRELESS NETWORKS

(71) Applicant: ZTE Corporation, Shenzhen (CN)

(72) Inventors: Zhuang Liu, Shenzhen (CN); Zijiang Ma, Shenzhen (CN); Dapeng Li, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 299 days.

(21) Appl. No.: 18/646,292

(22) Filed: Apr. 25, 2024

(65) Prior Publication Data

US 2024/0276451 A1 Aug. 15, 2024

Related U.S. Application Data

(63) Continuation of application No. PCT/CN2022/117956, filed on Sep. 8, 2022.

(51) Int. Cl.

*H04W 68/00* (2009.01)
*H04W 68/02* (2009.01)
(Continued)

(52) U.S. Cl.

CPC ........... *H04W 68/02* (2013.01); *H04W 76/19* (2018.02); *H04W 76/28* (2018.02)

(58) Field of Classification Search

CPC ..... H04W 68/02; H04W 76/19; H04W 76/28; H04W 76/27; H04W 68/005;
(Continued)

(56) References Cited

U.S. PATENT DOCUMENTS 11,516,735 B2 * 11/2022 Thangarasa ........... H04W 76/28
2022/0039046 A1 * 2/2022 Ianev .................... H04W 60/00
(Continued)

FOREIGN PATENT DOCUMENTS

CN 110536383 A 12/2019
CN 112005614 A 11/2020
(Continued)

OTHER PUBLICATIONS

International Search Report in International Application No. PCT/CN2022/117956 dated Apirl 23, 2022, 3 pages.
(Continued)

*Primary Examiner* — Phuoc H Doan
(74) *Attorney, Agent, or Firm* — Crowell & Moring LLP

(57) ABSTRACT

This disclosure relates generally to a method, device, and system for congestion control in a wireless network. One method performed by a first network element is disclosed. The method may include receiving, from a second network element, a configuration information of a wireless device, the wireless device being in a Radio Resource Control (RRC) inactive state; and in response to that there is data for the wireless device pending to be transmitted to the wireless device, transmitting, to the second network element, based on the configuration information, one of following: the data for the wireless device; or a paging request for paging the wireless device.

19 Claims, 7 Drawing Sheets

(51) Int. Cl.
*H04W 76/19* (2018.01)
*H04W 76/28* (2018.01)

(58) Field of Classification Search
CPC ............... H04W 52/0216; H04W 4/49; H04W 74/0833; H04W 60/00; H04W 24/02
See application file for complete search history.

(56) References Cited

U.S. PATENT DOCUMENTS

| | | | | |
|---|---|---|---|---|
| 2022/0272659 | A1* | 8/2022 | Agiwal | H04W 68/02 |
| 2024/0137871 | A1* | 4/2024 | Singh | H04W 52/0274 |
| 2025/0176065 | A1* | 5/2025 | Cui | H04W 68/005 |

FOREIGN PATENT DOCUMENTS

| | | |
|---|---|---|
| WO | WO 2021207940 | 10/2021 |
| WO | WO 2021208300 | 10/2021 |

OTHER PUBLICATIONS

Qualcomm Incorporated et al. "Overall evaluation and conclusion for Key issue 4 Track 1 (extended DRX support in RRC-Inactive/ CM-Connected)" 3GPP SA WG2 Meeting #129 S2-1811176, Oct. 19, 2018 (Oct. 19, 2018).

* cited by examiner

METHOD, DEVICE, AND SYSTEM FOR DATA TRANSMISSION IN WIRELESS NETWORKS

CROSS-REFERENCE TO RELATED APPLICATION

This application is a continuation application of PCT International Patent Application No. PCT/CN2022/117956, filed with the China National Intellectual Property Administration, PRC on Sep. 8, 2022, which is herein incorporated by reference in its entirety.

TECHNICAL FIELD

This disclosure is directed generally to wireless communications, and particularly to a method, device, and system for data transmission in a wireless network.

BACKGROUND

The ecosystem in a wireless communication network includes more and more applications that require low latency. These applications include Vehicle-to-Vehicle Communication, self-driving, mobile gaming, etc. Specifically, to control power consumption and reduce energy cost, a wireless device, such as a User Equipment, an Internet of Things (IoT) device, a Machine-to-Machine (M2M) device, and a Machine Type Communications (MTC) device, may be configured with various power saving configurations/modes, such as Discontinuous Reception (DRX) mode, Power Saving Mode (PSM). The wireless device may stay in a sleep mode for energy saving. It is critical to have the capability to control the power consumption at various network elements, such as base station and UE, and yet still meet performance requirement (e.g., low latency requirement). It is also beneficial to be able to coordinate various network elements, such as a base station and a core network, to at least efficiently utilize their buffering capabilities yet avoid causing buffer overflow.

SUMMARY

This disclosure is directed to a method, device, and system for data transmission in a wireless network.

In some embodiments, a method performed by a first network element is disclosed. The method may include: receiving, from a second network element, a configuration information of a wireless device, the wireless device being in a Radio Resource Control (RRC) inactive state; and in response to that there is data for the wireless device pending to be transmitted to the wireless device, transmitting, to the second network element, based on the configuration information, one of following: the data for the wireless device; or a paging request for paging the wireless device.

In some embodiments, a method performed by a first network element is disclosed. The method may include: transmitting, to a second network element, data for a wireless device served by the second network element, wherein the wireless device is in a Connection Management Connected (CM-Connected) state from a perspective of connection management, and wherein the wireless device is in an RRC inactive state from a perspective of RRC; and retaining the data for the wireless device that has been transmitted to the second network element.

In some embodiments, a method performed by a first network element is disclosed. The method may include: transmitting, to a second network element, a first message comprising configuration information of a wireless device, the wireless device being in an RRC inactive state; and receiving, from the second network element, one of following: data for the wireless device; or a paging request for paging the wireless device, wherein the second network element determines to transmit the data for the wireless device or the paging request based on the configuration information of the wireless device.

In some embodiments, a method performed by a first network element is disclosed. The method may include: receiving, from a second network element, data for a wireless device, the wireless device being served by the first network element, wherein: the wireless device is in a CM-Connected state from a perspective of connection management; the wireless device is in an RRC inactive state from a perspective of RRC; and the second network element retains the data for the wireless device that has been transmitted to the first network element.

In some embodiments, there is a network element or a network node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments.

The above embodiments and other aspects and alternatives of their implementations are described in greater detail in the drawings, the descriptions, and the claims below.

DETAILED DESCRIPTION

Wireless Communication Network

Figure 1:
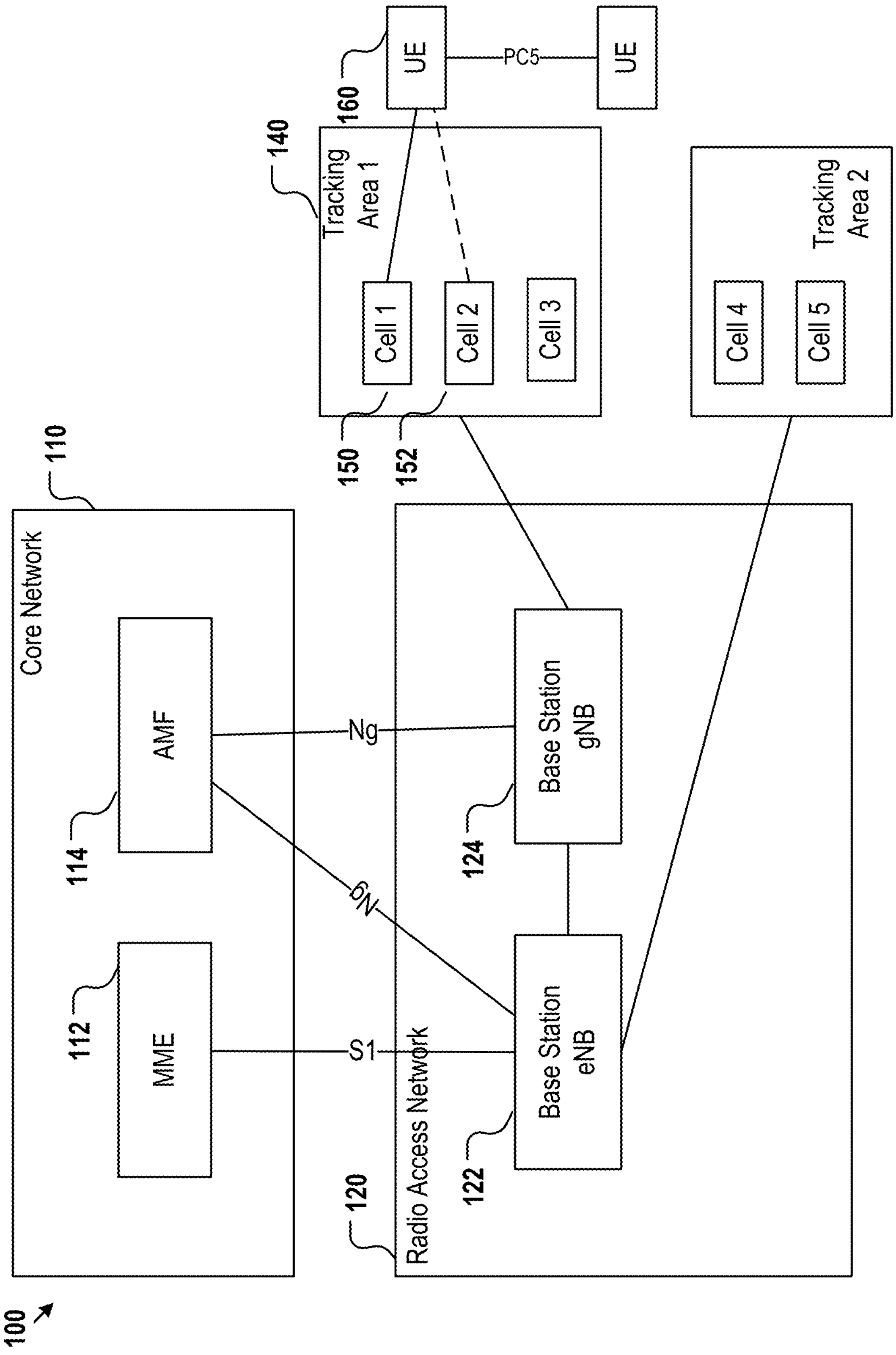
FIG. 1 shows an example wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, an enhanced LTE eNB (ng-eNB), or a Next generation NodeB (gNB) for 5G New Radio (NR), or any other type of signal transmitting/receiving device such as a UMTS NodeB. The eNB 122 communicates with the MME 112 via an SI interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select a cell among multiple cells supported by a base station to communication with the base station through Over the Air (OTA) radio communication interfaces and resources, and when the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB. The UE 160 may be implemented as mobile or fixed communication devices which are capable of accessing the wireless communication network 100. The UE 160 may include but is not limited to mobile phones, laptop computers, tablets, personal digital assistants, wearable devices, Internet of Things (IoT) devices, MTC/eMTC devices, distributed remote sensor devices, roadside assistant equipment, XR devices, and desktop computers. The UE 160 may also be generally referred to as a wireless communication device, or a wireless terminal. The UE 160 may support sidelink communication to another UE via a PC5 interface.

While the description below focuses on cellular wireless communication systems as shown in FIG. 1, the underlying principles are applicable to other types of wireless communication systems for paging wireless devices. These other wireless systems may include but are not limited to Wi-Fi, Bluetooth, ZigBee, and WiMax networks.

Figure 2:
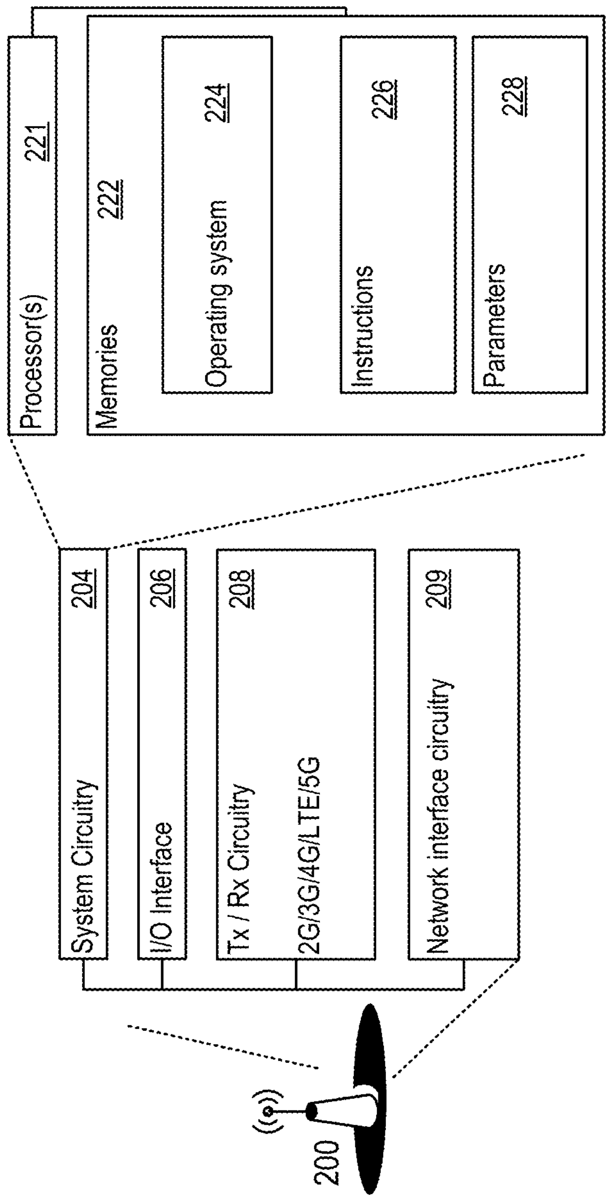
FIG. 2 shows an example wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
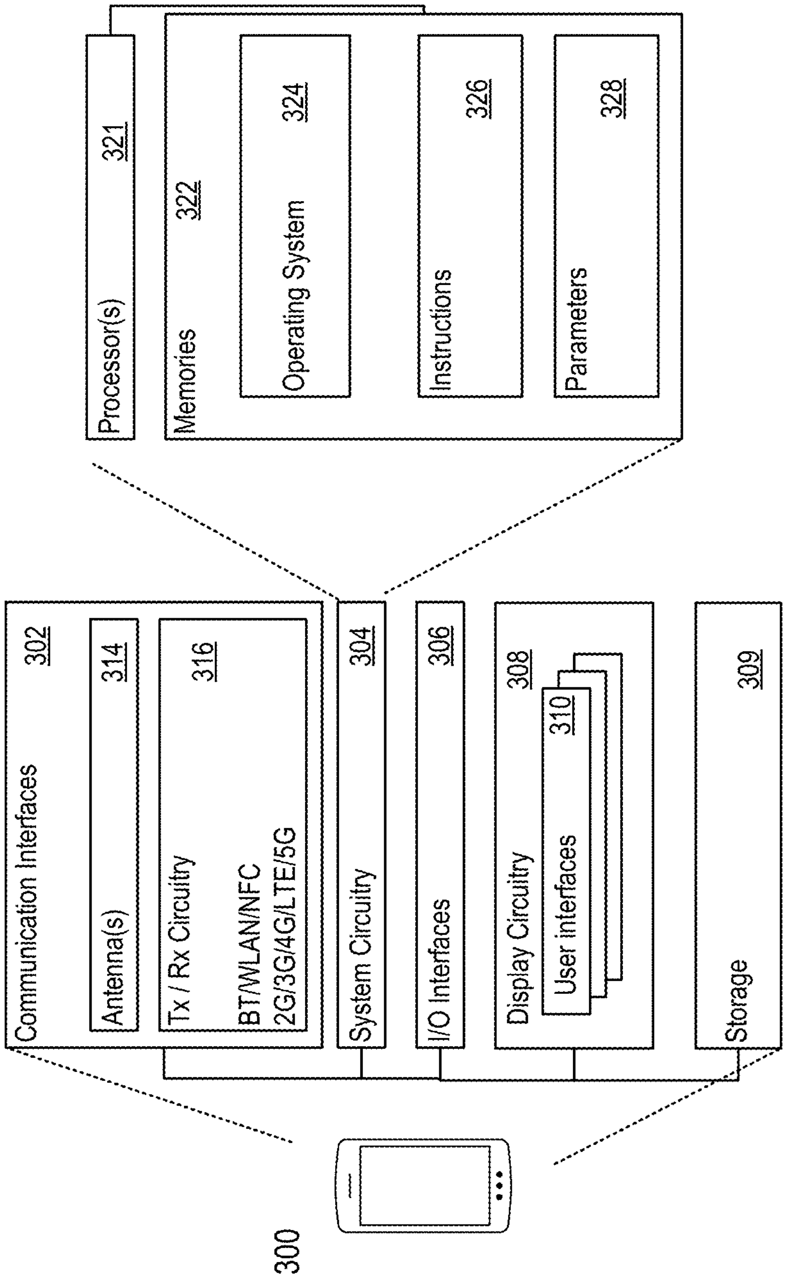
FIG. 3 shows an example user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

eDRX Mode

In a wireless communication network, a wireless device, such as a UE may always listen/monitor the network (e.g., a base station) to check if there is new downlink data. To always listen/monitor the network is not power efficient and would quickly drain the battery of the UE. For example, if the traffic for the UE is light, even there is no downlink reception or uplink transmission for the UE, the UE still need to keep awake to monitor the Physical Downlink Control Channel (PDCCH). In order to reduce UE power consumption, the wireless device may be configured with an eDRX (extended DRX) mode, for example, when the UE is in Radio Resource Control (RRC) inactive state. In the eDRX mode, a UE is only required to monitor paging channels during a Paging Occasion (PO) in the eDRX cycle. To even further reduce UE power consumption, a long eDRX cycle (e.g. longer than 10.24 seconds) may be configured to the UE. However, there is a tradeoff with the long eDRX cycle, as this may lead to longer data transmission latency. Further, on the base station side, the base station may have to wait for a long period (e.g., longer than 10.24 seconds) until the UE is successfully paged. During this waiting period, the base station may need to buffer the data received from the core network, which may lead to data buffer overflow, and even worse, data lost due to the overflow.

RRC Inactive State

In a wireless network, the RRC inactive (RRC_Inactive) state is one of the RRC states for a UE (in addition to RRC Connected state and RRC Idle state).

When the UE is in RRC inactive state, its RRC connection is not completely released even when there is no traffic. In some exemplary implementations, the base station still keeps UE context of the UE when the UE transitions to inactive state. The benefit is that when there is traffic for the UE, the UE may quickly switch back to RRC connected state for data transmission, without incurring heavy signaling overhead.

For example, when the UE is in RRC inactive state, the last serving base station of the UE may keep the UE context, as well as UE-associated NG connections with the 5G core network (5GC). If the last serving base station receives downlink data or downlink UE-associated signaling from the 5GC, the base station may start a paging procedure, to page the UE in the cells corresponding to the RAN-based Notification Area (RNA) associated with the base station. Note that if the RNA includes cells from neighboring base station(s), then the base station may also send XnAP RAN Paging to the neighboring base station(s). Note that in this disclosure, for simplicity, UE data may generally refer to UE payload data and signaling.

From the core network perspective, when there is data pending for an inactive UE, the core network may choose to transmit the data to the last serving base station of the UE. Until the last serving base station is able to page the UE successfully, the last serving base station may need to engage a buffering mechanism, to buffer the UE data received from the core network. After the UE is paged, the UE may trigger the RRC resume procedure to transit from RRC inactive state to RRC connected state, then the last serving base station may start to send UE data to the UE. The UE data may include UE data already buffered by the last serving base station, and UE data subsequently sent from the core network to the last serving base station.

The aforementioned buffering mechanism may have a potential issue with regard to buffer overflow, and this issue may be more serious and obvious when a UE in inactive state is configured with a long eDRX cycle. When there is UE data coming, the base station may have to wait for a long period (e.g., longer than 10.24 seconds) until UE is successfully paged. Longer waiting period implies higher requirement for the base station's buffering capability. When the waiting period is long, more and more UE data may be accumulated on the base station side, which may lead to buffer overflow and/or UE data lost due as a result of the overflow condition.

Further, the volume of the UE data that needs to be transmitted from the core network, together with an instant base station buffering capability, may play an important role in the buffering mechanism. It is beneficial for the base station to update the core network about its instant buffering capability, for example, by informing the core network an upper limit for UE data volume (or data amount) that the base station may handle (e.g., able to buffer).

In this disclosure, various embodiments are disclosed, aiming for reducing data transmission latency, yet take advantage of base station's buffering capability without causing overflow (or reducing the probability of causing overflow). These embodiments cover at least:

- Coordination between the base station and the core network to achieve robust and flexible buffering mechanisms.
- Triggering paging procedure via various manners, including implicit triggering (e.g., via UE data) and explicit triggering (e.g., via signaling).
- Fallback mechanism in case a RAN paging fails, without losing UE data.

Details on these embodiments are described below.

Embodiment 1: UE RRC Resume Triggered by Incoming UE Data

In a wireless communication network, for the purpose of power saving yet still being able to switch to connected state quickly to reduce latency, a wireless device/terminal, such as a UE, may be released, for example, by the Radio Access Network (RAN), to an RRC inactive state (or mode). In the inactive state, the UE context is not released but is rather still stored at base station and the UE. Meanwhile, NG signaling keeps alive between the base station and a core network (or a core network node, such as the AMF).

In this disclosure, the core network may generally refer to a core network which includes various nodes such as network elements, or a core network node within the core network, for example, an AMF, a UPF, etc.

When the UE is in RRC inactive state, there may be data for the UE arriving or pending at the core network, for example, when a new application for the UE initiates data transmission. The data may include payload data (such as application data), signaling data, etc. In some implementations, under certain conditions, without any signaling, the core network may transmit the data (or a portion of the data) for the UE directly to the base station serving the UE. A reception of the data for the UE by the base station may trigger subsequent actions to put UE in a suitable state for receiving the data. More details will be described below.

Figure 4:
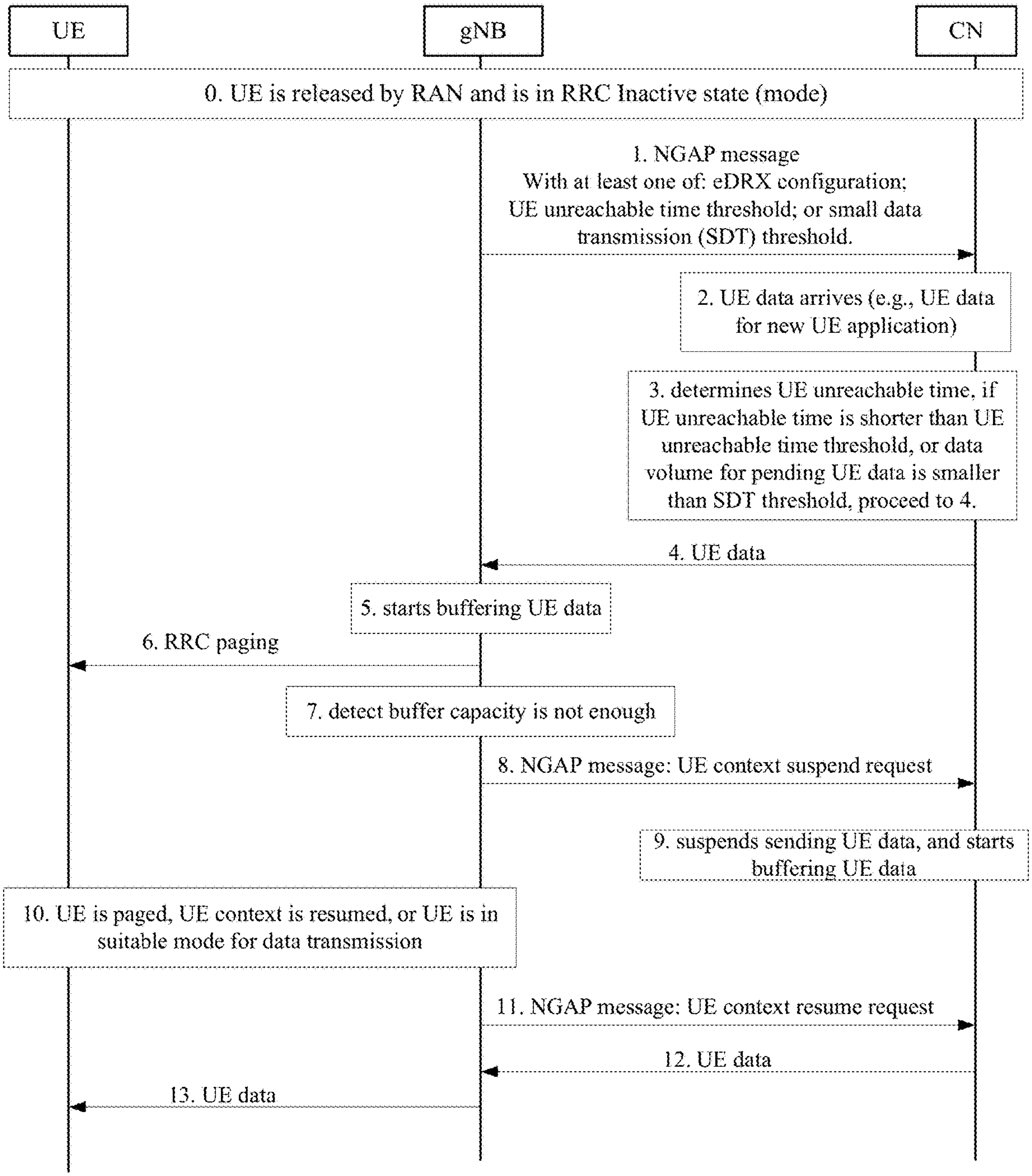
FIG. 4 shows exemplary message flow and interactions among a core network, a base station, and a UE, for transmitting data to the UE which is initially in an RRC inactive state.

FIG. 4 shows exemplary message flow and interactions among a core network, a base station, and a UE, for transmitting data to the UE which is initially in an RRC inactive state. As shown in FIG. 4, an exemplary implementation may include the following steps:

Step 0:

UE is released by RAN and transitions to the RRC inactive state. In this state, the UE may be in an extended Discontinuous Reception (eDRX) mode with a particular eDRX configuration, such as an eDRX cycle. In one implementation, the UE may be configured with a long eDRX cycle (e.g., longer than 10.24 seconds).

Step 1:

To coordinate data transmission for the UE (e.g., in RRC inactive state), the base station (e.g., a gNB, an eNB, an ng-eNB, a nodeB, etc.) may send a message to the core network. The message may be sent via, for example, an NG Application Protocol (NGAP) message. The message may inform the core network that the UE is in an RRC inactive state. Note that from an RRC perspective, a UE may be in various RRC states, including the RRC inactive state. Meanwhile, from a core network (or Configuration Management (CM)) perspective, a UE may be in various CM states, such as a CM-idle state, or a CM-connect state.

The message may further include at least one of following information:

- eDRX configuration information which may include: an eDRX cycle, a Paging Time Window (PTW) configuration. Note that a UE may be configured with multiple eDRX configurations. A particular eDRX configuration may be enabled depending on UE state. For example, the eDRX configuration may include an inactive eDRX configuration, which may be applied/enabled when the UE is in an RRC inactive state. The eDRX configuration information included in the message may be the inactive eDRX configuration information.
- unreachable time threshold; or
- data volume threshold.

The usage of unreachable time threshold and data volume threshold will be described in detail later.

Note that the base station may send the message to the core network for multiple times, for example, in the event that an eDRX configuration of the UE is changed, a new message covering the updated configuration will be sent.

Step 2:

There is data for the UE that arrives at the core network. For example, an application of the UE initiates data transmission to the UE.

Step 3:

The core network may determine a time duration from a current moment till the time that the UE is able to be reached (e.g., the UE is able to be paged), based on the eDRX configuration. This time duration may be referred to as a UE unreachable duration. For example, the core network may calculate the next Paging Occasion (PO) monitored by the UE based on the received inactive eDRX configuration information, and the time till the next PO is the UE unreachable duration.

Figure 5:
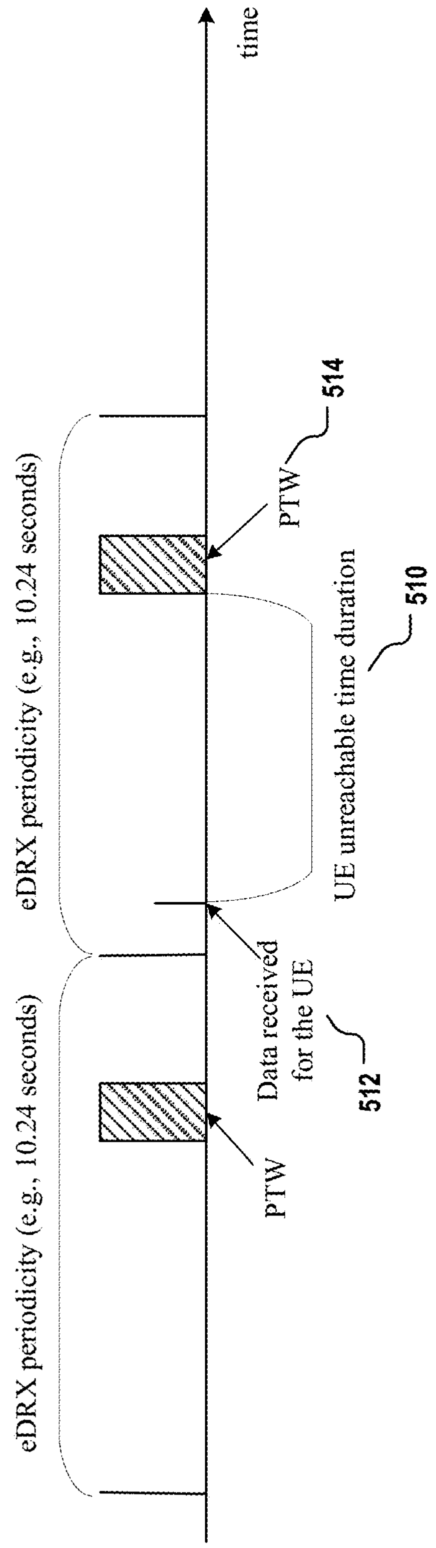
FIG. 5 shows an exemplary eDRX configuration and a UE unreachable time period.

FIG. 5 shows an example UE unreachable time duration 510. As shown in FIG. 5, the UE is in an eDRX mode, with an eDRX cycle of 10.24 seconds. There is UE data arrives at 512. The UE unreachable time duration may start from 512, till the start time of the next Paging Time Window (PTW) 514.

The core network, informed with the eDRX configuration of the UE, may be able to decide as whether to buffer the UE data (e.g., wait till UE is able to receive data) or to start transmitting the UE data to the base station immediately, even the paging procedure for paging the UE is still in progress.

In one implementation, the decision may be made based on the UE unreachable duration. If the UE unreachable duration is short (e.g., shorter than the unreachable time threshold), which implies that the UE may be paged relatively quick so the base station does not need to buffer excessive amount of UE data, then the core network may start to transmit the UE data, so as to reduce data transmission latency without causing buffer overflow on the base station side.

In one implementation, the unreachable time threshold may be correlated with base station's buffering capability. For example, the more the buffering capability at the base station, the longer the unreachable time threshold may be set to.

In one implementation, the decision may be made based on a volume of pending data for the UE. For example, if the volume of pending data is relatively low (e.g., lower than the data volume threshold), then the core network may assume the low volume data will not cause buffer overflow on the base station, and may proceed directly to transmit the UE data to the base station.

In one implementation, the data volume threshold may be associated with Small Data Transmission (SDT) mode and may be determined based on an SDT configuration.

In one implementation, when the volume of pending data for the UE is low (lower than the data volume threshold), a Small Data Transmission (SDT) mechanism may be employed. Under such mechanism, the UE may not need to transition to a connected state to receive data, which reduces signaling overhead and improves overall data transmission efficiency.

Step 4:

Based on the decision made in step 3, the core network may proceed to send UE data to the base station.

Step 5:

The UE is not able to receive data yet, for example, as the UE is not in a suitable mode. The base station may start buffering the received data.

Step 6:

The base station may initiate a paging procedure, for example, by sending an RRC paging message to the UE which is in the inactive state, to page the UE.

Step 7:

The paging procedure is still in progress. In one implementation, the base station may keep monitoring its buffer status for ensure there is enough buffer for buffering the UE data. In this step, the base station may detect that its buffer capacity is not enough (e.g., the buffer queue is nearly full, reaching a predefined threshold, etc.). In one implementation, the base station may also detect that a buffer capacity of the buffer allocated in the base station to serve the UE will overflow, for example, in a predefined duration and/or based on current data rate for the UE.

Step 8:

When the base station detects or is under assumption that its buffer capacity is not enough, and/or further data buffering will cause an overflow, the base station may engage certain traffic control mechanism, for example, by requesting the core network to suspend data transmitting.

In one implementation, the base station may send a message, such as an NGAP message to the core network, to request the core network suspending UE data transmission. The NGAP message may include a UE CONTEXT SUSPEND REQUEST message.

Step 9:

Upon receiving the message sent from the base station (as described in step 8), the core network may suspend sending UE data (i.e., downlink (DL) data for the UE) to the base station. The core network may as well start buffering DL data.

Step 10:

The UE is paged successfully. The base station may resume UE context of the UE and/or transition the UE to RRC connected state for data transmission. Alternatively, the base station may only resume the UE context, but keep the UE in RRC inactive state, for example, for small data transmission.

Step 11:

As the UE is awake or is in a suitable mode (e.g., SDT mode) for receiving DL data, the base station is eased from continuing buffering the UE data. The base station may send a message, such as an NGAP message to request the core network to resume data transmission for the UE. The NGAP message may include a UE CONTEXT RESUME REQUEST message.

Step 12:

The core network may continue/resume data transmission by sending remaining/subsequent data for the UE to the base station.

Step 13:

The base station may send buffered DL data (in step 5) and the subsequent received DL data to the UE. Note that the base station may have the option to start forwarding buffered DL data to the UE right after step 10, once the UE is awake or is in a suitable mode for data reception.

In this embodiment, when there is data arriving or pending for the UE, the core network may implicitly trigger the base station to page the UE by just sending the UE data (or a portion of the UE data) directly, without using a signaling.

Embodiment 2: UE RRC Resume Triggered by Core Network Signaling

In this embodiment, contrary to embodiment 1, the core network may not send pending UE data to a UE which is in RRC inactive mode, due to various reasons, such as a long UE unreachable time duration, base station buffer capacity limitation, etc., which will be described in detail below. In this case, the core network would need to trigger a RAN paging procedure explicitly, via signaling, to page the UE. The core network may also need to buffer the UE data. To take the advantage of base station's buffering capability, when the RAN paging procedure is in progress, the base station may notify the core network an "allowed data volume". The core network may then start to transmit UE data to the base station, up to the allowed data volume, even when the paging procedure is still in progress.

Figure 6:
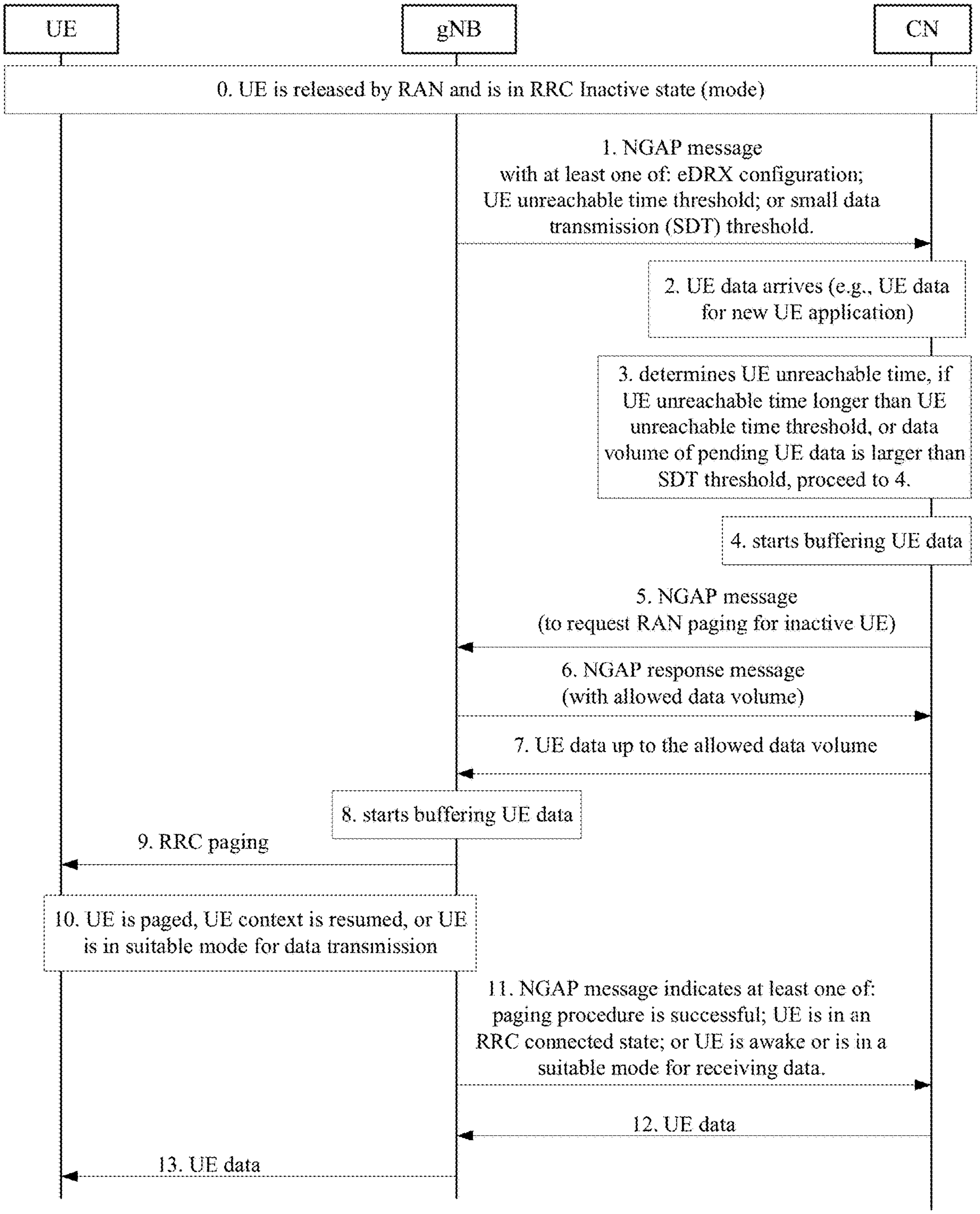
FIG. 6 shows another exemplary message flow and interactions among a core network, a base station, and a UE, for transmitting data to the UE which is initially in an RRC inactive state.

FIG. 6 shows another exemplary message flow and interactions among a core network, a base station, and a UE, for transmitting data to the UE which is initially in an RRC inactive state. As shown in FIG. 6, the exemplary implementation may include the following steps:

Step 0:

UE is released by RAN and transitions to the RRC inactive state. In this state, the UE may be in eDRX mode with a particular eDRX configuration, such as an eDRX cycle. In one implementation, the UE may be configured with a long eDRX cycle (e.g., longer than 10.24 seconds).

Step 1:

To coordinate data transmission for the UE (e.g., in RRC inactive state), the base station (e.g., a gNB, an eNB, an ng-eNB, a nodeB, etc.) may send a message to the core network. The message may be sent via, for example, an NG Application Protocol (NGAP) message. The message may inform the core network that the UE is in an RRC inactive state.

The message may further include at least one of following information:

- eDRX configuration information which may include: an eDRX cycle, a PTW configuration. Note that a UE may be configured with multiple eDRX configurations, depending on UE state. For example, the eDRX configuration may include an inactive eDRX configuration, which may be applied when the UE is in an RRC inactive state. The eDRX configuration information included in the message may be the inactive eDRX configuration information.
- unreachable time threshold; or
- data volume threshold.

Details for the information above may be found in embodiment 1.

Step 2:

There is data for the UE that arrives at the core network.

Step 3:

The core network may determine a time duration from a current moment till the time that the UE is able to be reached (e.g., the UE is able to be paged), based on the eDRX configuration. This time duration may be referred to as a UE unreachable duration. For example, the core network may calculate the next Paging Occasion (PO) monitored by the UE based on the received inactive eDRX configuration information, and the time till the next PO is the UE unreachable duration.

The core network, informed with the eDRX configuration of the UE, may be able to decide as whether to buffer the UE data (e.g., wait till UE is able to receive data) or to start transmitting the UE data to the base station immediately.

In one implementation, the decision may be made based on the UE unreachable duration. If the UE unreachable duration is long (e.g., longer than the unreachable time threshold), then the UE paging may suffer a long delay causing the base station to buffer excessive amount of UE data, which may lead to buffer overflow on the base station side. In this case, the core network may decide to buffer the UE data, rather than pushing the UE data to the base station before further notification from the base station.

In one implementation, the unreachable time threshold may be correlated with base station's buffering capability. For example, the more the buffering capability at the base station, the longer the unreachable time threshold can be.

In one implementation, the decision may be made based on a volume of pending data for the UE. For example, if the volume of pending data is relatively high (e.g., higher than the data volume threshold), then the core network may decide to buffer the UE data.

Step 4:

Based on the decision made in step 3, the core network may start to buffer the UE data.

Step 5:

The core network may trigger a paging procedure, such as a RAN paging procedure by sending an NGAP message to the base station, to request the base station paging the inactive UE.

Step 6:

The base station, upon receiving the message from the core network for the paging request, may send a response back to the core network. Meanwhile, to reduce data transmission latency, the base station may instruct the core network to start UE data transmission, even the paging procedure is still in progress. Specifically, the base station may check its instant buffer capability, and determine an allowed data volume. The base station may include the allowed data volume in the response message, or in a separate message. For example, the allowed data volume may be 10 Megabyte.

Step 7:

The core network, learning from the response message, that the base station supports data buffering up to the allowed data volume. So even the paging procedure is still in progress, the core network may proceed to send UE data to the base station up to the allowed data volume. Therefore, the data transmission latency may be reduced.

Step 8:

The base station may buffer the UE data.

Step 9:

The base station may start a paging procedure (e.g., a RAN paging procedure) by sending an RRC paging message to the UE.

Note that step 9 may be performed before, after, or in parallel with step 8.

Step 10:

The UE is paged successfully. The base station may resume UE context of the UE and/or transition the UE to RRC connected state for data transmission. Alternatively, the base station may only resume the UE context, but keep the UE in RRC inactive state, for example, for small data transmission.

Step 11:

The base station may send a message, such as an NGAP message to the core network indicating that the paging procedure is successful. The message may indicate that the UE is in an RRC connected state, and/or the UE is awake or is in a suitable mode (e.g., SDT mode) for receiving UE data.

Step 12:

The UE is now in a suitable mode for receiving UE data. The core network may continue data transmission by sending remaining/subsequent DL data for the UE to the base station.

Step 13:

The base station may send buffered DL data (in step 4) and the subsequent received DL data to the UE. Note that the base station may have the option to start forward buffered DL data to the UE right after step 10, once the UE is in the RRC connected state and/or is awake and/or is in a suitable mode for data reception.

In this embodiment, when there is data arriving or pending for the UE, the core network may explicitly trigger the base station to page the UE via signaling, such as an NGAP message. When the paging procedure is still in progress, the base station has the option to transmit UE data to the base station, up to an allowed data volume as indicated by the base station. Therefore, UE data transmission latency may be reduced.

Embodiment 3: RAN Paging Failure Fallback

When the UE is released by the RAN and transitions to the RRC inactive state, from the core network perspective, the UE is in a CM-Connected state. In this embodiment, the core network may further store UE's RRC connection state. For example, a UE may be marked as in CM-Connected and RRC inactive state. This combined state may be employed by the core network for making UE data transmission decision, for a UE in CM-Connected and RRC inactive state.

Note that in this embodiment, the core network may trigger a paging procedure to page the UE via method described in embodiment 1 (i.e., implicit triggering via UE data transmission), and/or via method described in embodiment 2 (i.e., explicit triggering via signaling). The details for trigger the paging procedure may be found in respective embodiment and are skipped in this embodiment.

In addition, in this embodiment, a fallback mechanism for UE data transmission, which involves core network paging, is implemented, in the event that a RAN paging procedure fails.

Figure 7:
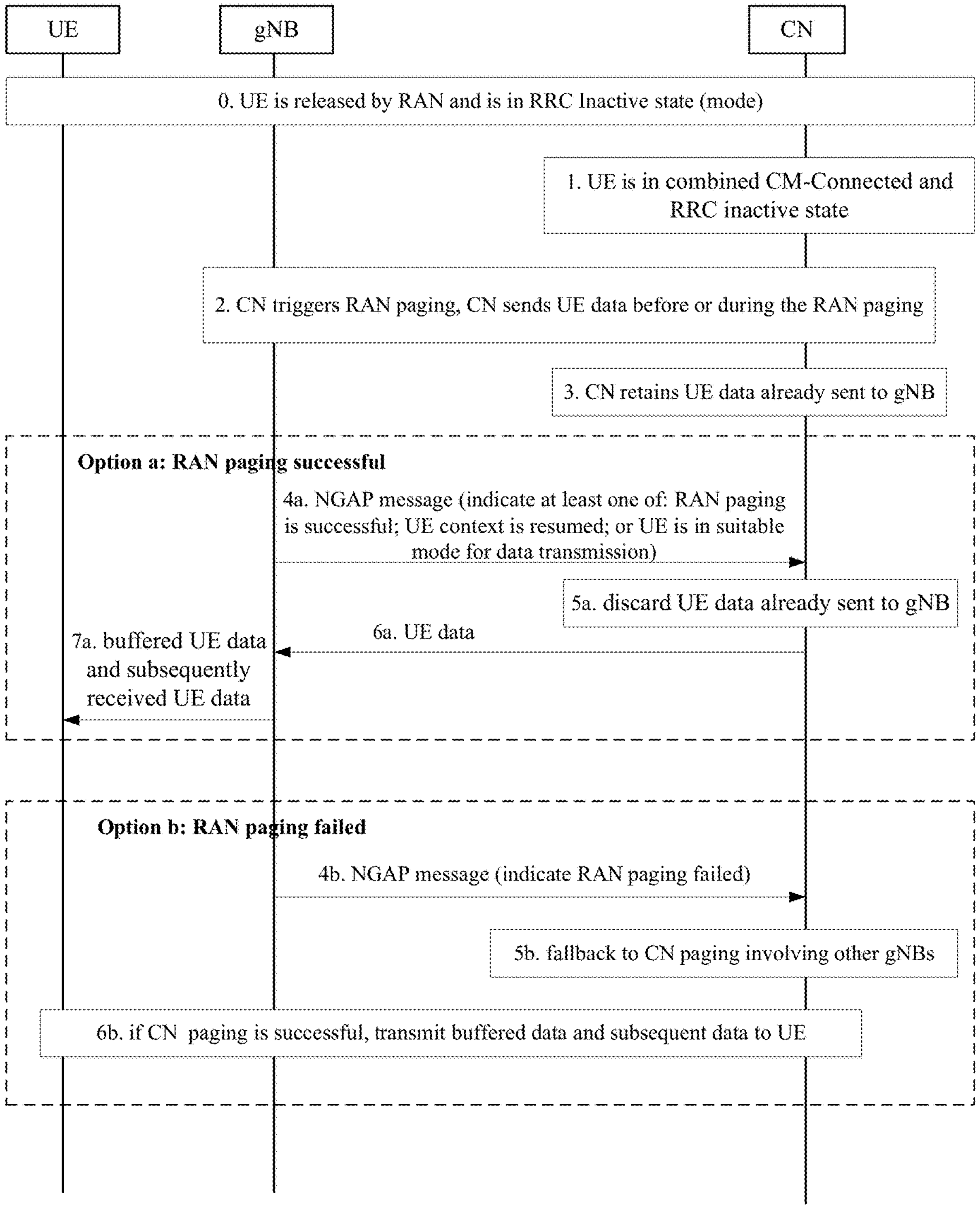
FIG. 7 shows an exemplary fallback mechanism for transmitting data to a UE which is initially in an RRC inactive state.

FIG. 7 shows exemplary message flow and interactions among a core network, a base station, and a UE, for transmitting data to the UE which is initially in an RRC inactive state. As shown in FIG. 7, the exemplary implementation may include the following steps:

Step 0:

UE is released by RAN and transitions to the RRC inactive state. In this state, the UE may be in an eDRX mode with a particular eDRX configuration, such as an eDRX cycle, a PTW configuration, etc. In one implementation, the UE may be configured with a long eDRX cycle (e.g., longer than 10.24 seconds).

Step 1:

The core network may store or mark a combined state (from CM perspective and RRC perspective) for the UE, for example, when the RAN releases the UE and the UE transitions to an inactive state. In this case, the combined state is CM-Connected and RRC inactive state.

Step 2:

The core network may trigger a paging procedure (e.g., a RAN paging) by sending UE data directly, as described in embodiment 1, or via signaling, as described in embodiment 2.

Also note that the core network may have the option to transmit UE data before a paging procedure is triggered, and/or during the paging procedure.

Step 3:

While the UE is in a combined CM-Connected and RRC inactive state, the core network may transmit UE data to the base station. However, the core network does not discard the UE data already sent to the base station. Instead, the core network will retain the already transmitted UE data.

After step 3, the method may include two options a and b, depending on whether the RAN paging procedure is successful.

Option a: RAN Paging Successful

In this option, the RAN paging procedure is successful.

Step 4*a:*

The base station may send a message, such as an NGAP message to the core network to inform that the RAN paging is successful. Additionally or alternatively, the base station may inform (e.g., via the same or another message) the core network at least one of: that the UE is transferred to an RRC connected state, the UE context of the UE is resumed on the base station side. The base station may further request the core network to resume UE context of the UE.

Step 5a:

After receives the message, the CN discard the data already sent to the base station.

Step 6a:

the CN continues to send subsequent DL data to the base station.

Step 7a:

The base station may send buffered UE data and the subsequent received DL data to the UE. Note that the base station may start to send the UE data right after the UE is in a suitable mode for receiving data (e.g., UE transitions to RRC connect state, UE context of the UE is resumed, SDT is enabled). Step 7a may be performed in parallel with any of steps 4*a*-6*a*.

Option b: RAN Paging Failure

In this option, the RAN paging procedure fails.

Step 4b:

The RAN paging procedure fails. The base station may send a message, such as an NGAP message to the core network, to notify the RAN of the paging failure.

Step 5*b:*

The core network, upon receiving the message indicating the RAN paging failure, may fallback to a core network paging (CN paging). The CN paging may cover a larger area served by more base stations, as compared with the failed RAN paging. The core network may send a CN paging message to other base stations.

Step 6b:

If the CN paging is successful (e.g., the UE was paged successfully by another base station), the core network may transmit the complete UE data to the UE (via UE's current serving base station as a result of the CN paging), which include UE data that was previously sent to the base station and retrained by the core network in step 3 to the UE (via the another base station).

In this disclosure, for at least the purpose of saving energy consumption at a base station, a DTX mode is introduced. The DTX mode may apply to various levels targeting different granularities. For example, the DTX may apply to a cell level, a cell group level, a DU level, a DU group level, a base station level, or the like. In this disclosure, description may be made under the cell level for exemplary purpose. The same underlying principle applies to other levels as well.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for wireless communication, performed by a first network element, the method comprising:

receiving, from a second network element, a configuration information of a wireless device, the wireless device being in a Radio Resource Control (RRC) inactive state, wherein the configuration information of the wireless device comprises an inactive extended Discontinuous Reception (eDRX) configuration comprising at least one of: an eDRX cycle; or a Paging Time Window (PTW) configuration for inactive eDRX:

in response to that there is data for the wireless device pending to be transmitted to the wireless device, transmitting a paging request for paging the wireless device to the second network element, based on the configuration information, wherein the first network element comprises one of a Core Network (CN) or a CN node, and wherein the second network element comprises a base station.

2. The method of claim 1, wherein the configuration information further comprises a data volume threshold, and wherein the data volume threshold is an upper limit of data volume that can be transmitted to the wireless device via the second network element when the wireless device is in the RRC inactive state.

3. The method of claim 1, wherein the configuration information further comprises an unreachable time threshold, and wherein transmitting the paging request for paging the wireless device to the second network element, comprises:

determining a time duration from a current moment till an earliest time that the wireless device is able to be reached; and in response to the time duration being longer than the unreachable time threshold, transmitting the paging request for paging the wireless device.

4. The method of claim 1, wherein the configuration information further comprises a data volume threshold, and wherein transmitting the paging request for paging the wireless device to the second network element, comprises:

in response to a pending data volume to be transmitted to the wireless device being larger than the data volume threshold, transmitting the paging request for paging the wireless device.

5. The method of claim 1, wherein transmitting the paging request for paging the wireless device comprises transmitting an NG Application Protocol (NGAP) message to request a Radio Access Network (RAN) paging for the wireless device.

6. The method of claim 1, further comprising:

receiving, from the second network element, a first message indicating the first network element to suspend transmitting the data for the wireless device, wherein the first message is triggered by a first condition that a buffer capacity of a buffer in the second network element and serving the wireless device is not enough or the buffer capacity is lower than a buffer threshold; and suspending transmitting the data for the wireless device.

7. The method of claim 6, further comprising:

receiving, from the second network element, a second message indicating the first network element to resume transmitting the data for the wireless device, wherein the second message is triggered by a second condition that comprises at least one of:

the wireless device transitioning to an RRC connected state;

the wireless device being paged successfully;

a UE context of the wireless device being resumed successfully and the wireless device staying in RRC inactive state;

the buffer capacity of the buffer in the second network element and serving the wireless device being enough; or the buffer capacity of the buffer in the second network element and serving the wireless device being higher than the buffer threshold; and resuming transmitting the data for the wireless device.

8. The method of claim 1, wherein:

transmitting, to the second network element, based on the configuration information, the one of following comprises:

transmitting the paging request to the wireless device, the paging request initiating a paging procedure for paging the wireless device; and before the paging procedure is completed, the method further comprises:

receiving, from the second network element, a third message comprising an allowed data volume and indicating that the first network element is allowed to transmit the data for the wireless device up to the allowed data volume; and in response to a reception of the third message, transmitting the data for the wireless device such that a volume of transmitted data does not exceed the allowed data volume.

9. A device for wireless communication comprising a memory for storing computer instructions and a processor in communication with the memory, wherein, when the processor executes the computer instructions, the processor is configured to implement a method in claim 1.

10. A method for wireless communication, performed by a first network element, the method comprising:

transmitting, to a second network element, a first message comprising configuration information of a wireless device, the wireless device being in an RRC inactive state, wherein the configuration information of the wireless device comprises an inactive extended Discontinuous Reception (eDRX) configuration comprising at least one of: an eDRX cycle; or a Paging Time Window (PTW) configuration for inactive eDRX, and wherein the first message comprises an NGAP message; and receiving a paging request for paging the wireless device from the second network element, wherein the second network element determines to transmit the paging request based on the configuration information of the wireless device, wherein the first network element comprises a base station, and wherein the second network element comprises one of a Core Network (CN) or a CN node.

11. The method of claim 10, wherein the configuration information of the wireless device further comprises at least one of:

an unreachable time threshold; or a data volume threshold.

12. The method of claim 10, wherein:

receiving, from the second network element, the one of following comprises receiving the data for the wireless device;

the method further comprising:

buffering the data for the wireless device; and initiating a paging procedure for paging the wireless device.

13. The method of claim 12, wherein before the paging procedure is completed, the method further comprising:

in response to that a buffer capacity of a buffer in the first network element and serving the wireless device is not enough or the buffer capacity is lower than a buffer threshold, transmitting, to the second network element, a second message indicating the second network element to suspend transmitting the data for the wireless device.

14. The method of claim 13, wherein the second message comprises a UE context suspend request message.

15. The method of claim 13, further comprising:

in response to at least one of following conditions:

the wireless device transitioning to an RRC connected state;

the wireless device being paged successfully;

a UE context of the wireless device being resumed successfully and the wireless device staying in the RRC inactive state;

the buffer capacity of the buffer in the first network element and serving the wireless device being enough; or the buffer capacity of the buffer in the first network element and serving the wireless device being higher than the buffer threshold, transmitting, to the second network element, a third message indicating the second network element to resume transmitting the data for the wireless device.

16. The method of claim 10, wherein:

receiving, from the second network element, the one of following comprises receiving the paging request for paging the wireless device; and the method further comprising:

initiating an RRC paging procedure for paging the wireless device.

17. The method of claim 16, wherein before the RRC paging procedure is completed, the method further comprises:

transmitting, to the second network element, a fourth message comprising an allowed data volume and indicating that the second network element is allowed to transmit the data for the wireless device up to the allowed data volume; and receiving and buffering the data for the wireless device transmitted from the second network element triggered by the fourth message.

18. A computer program product comprising a non-transitory computer-readable program medium with computer code stored thereupon, the computer code, when executed by one or more processors, causing the one or more processors to implement a method of claim 10.

19. A first network element comprising a memory for storing computer instructions and a processor in communication with the memory, wherein, when the processor executes the computer instructions, the processor is configured to cause the first network element to:

transmit, to a second network element, a first message comprising configuration information of a wireless device, the wireless device being in an RRC inactive state, wherein the first message comprises an NGAP message, and wherein the configuration information of the wireless device comprises an inactive extended Discontinuous Reception (eDRX) configuration comprising at least one of: an eDRX cycle; or a Paging Time Window (PTW) configuration for inactive eDRX receive a paging request for paging the wireless device from the second network element, one of following:

data for the wireless device; or a paging request for paging the wireless device, wherein the second network element determines to transmit the paging request based on the configuration information of the wireless device, wherein the first network element comprises a base station, and wherein the second network element comprises one of a Core Network (CN) or a CN node.

* * * * *